(12) United States Patent
Van Den Brink et al.

(10) Patent No.: US 7,582,588 B2
(45) Date of Patent: Sep. 1, 2009

(54) METHOD OF MANUFACTURING A CATALYST

(75) Inventors: Peter John Van Den Brink, Amsterdam (NL); Ronald Jan Dogterom, Amsterdam (NL); Carolus Matthias Anna Maria Mesters, Amsterdam (NL)

(73) Assignee: Shell Oil Company, Houston, TX (US)

(*) Notice: Subject to any disclaimer, the term of this patent is extended or adjusted under 35 U.S.C. 154(b) by 174 days.

(21) Appl. No.: 11/924,441

(22) Filed: Oct. 25, 2007

(65) Prior Publication Data

US 2008/0167180 A1    Jul. 10, 2008

(30) Foreign Application Priority Data

Oct. 27, 2006    (EP)    .................... 06123098

(51) Int. Cl.

| B01J 21/00 | (2006.01) |
|---|---|
| B01J 23/00 | (2006.01) |
| B01J 32/00 | (2006.01) |
| B01J 37/00 | (2006.01) |
| B21C 23/00 | (2006.01) |
| B21C 23/02 | (2006.01) |
| B21C 25/02 | (2006.01) |
| B21D 37/00 | (2006.01) |
| B21D 37/02 | (2006.01) |
| B21D 37/10 | (2006.01) |
| B21D 37/14 | (2006.01) |

(52) U.S. Cl. ............ 502/300; 502/302; 502/305; 502/324; 502/325; 502/340; 502/344; 502/349; 502/353; 502/355; 502/439; 502/514; 419/67; 425/110; 425/112; 425/113; 425/130; 425/131.1; 425/461; 425/462; 425/463; 164/169; 164/174; 164/412; 72/253.1; 72/260; 72/261; 72/372; 72/467; 72/468; 72/469; 72/470; 72/474

(58) Field of Classification Search .............. 502/300, 502/302, 305, 324, 325, 340, 344, 349, 353, 502/355, 439, 514; 419/67; 425/110, 112, 425/113, 130, 131.1, 461, 462, 463; 164/169, 164/174, 412; 72/253.1, 260, 261, 372, 467, 72/468, 469, 470, 474

See application file for complete search history.

(56) References Cited

U.S. PATENT DOCUMENTS 3,881,984 A  *  5/1975  Soda et al.  ................. 156/500

(Continued)

FOREIGN PATENT DOCUMENTS

EP    0369708    5/1990

(Continued)

*Primary Examiner*—Timothy C Vanoy
*Assistant Examiner*—Serena L Hanor (57) ABSTRACT

A method of manufacturing a catalyst, a catalyst precursor, or a catalyst support comprising:
(a) mixing a refractory metal oxide or precursor thereof with a liquid to form a paste;
(b) adding said paste to an extruder, the extruder having a die plate comprising one or more dies, each die having a plurality of apertures, the outlet of each aperture having a cross sectional area of 6 mm$^2$ or less;
(c) extruding the paste through the apertures to form catalyst support extrudates;
wherein the inlet of the apertures has a greater cross sectional area than the outlet of said apertures; and wherein for at least one die the combined cross sectional area of all apertures at the inlet relative to the total cross sectional area of the die at the inlet is higher than 50%.

16 Claims, 2 Drawing Sheets

U.S. PATENT DOCUMENTS

| | | | |
|---|---|---|---|
| 3,901,065 A * | 8/1975 | Schmehl | 72/468 |
| 4,016,108 A * | 4/1977 | Robson | 502/322 |
| 4,495,307 A | 1/1985 | Clements | |
| 4,517,077 A | 5/1985 | Clements | |
| 4,960,554 A | 10/1990 | Bambrick | |
| 6,709,570 B1 * | 3/2004 | Van Crijnen-Beers et al. | 208/111.01 |
| 7,488,464 B2 * | 2/2009 | Hammel et al. | 423/592.1 |

FOREIGN PATENT DOCUMENTS

| | | |
|---|---|---|
| EP | 291682 | 9/1992 |
| EP | 510770 | 10/1992 |
| EP | 1042067 | 4/2004 |
| WO | WO03103833 | 12/2003 |
| WO | WO2004041430 | 5/2004 |

* cited by examiner

METHOD OF MANUFACTURING A CATALYST

This application claims the benefit of European Application No. 06123098.3 filed Oct. 27, 2006 which is incorporated herein by reference.

BACKGROUND

The present invention relates to a method of, and a die for, extruding a catalyst, a catalyst precursor, or a catalyst support. The method is suitable in a process for manufacturing a catalyst, catalyst precursor, or a catalyst support for use in a multitubular fixed bed reactor. The method is particularly but not exclusively suitable in a process for manufacturing a catalyst, catalyst precursor, or a catalyst support for use in a Fischer-Tropsch process.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into one or more reactors where it is converted in one or more steps over a suitable catalyst at elevated temperature and pressure into mainly paraffinic compounds ranging from methane to high molecular weight modules comprising up to 200 carbon atoms, or, under particular circumstances, even more. Preferably the amount of $C_{5+}$ hydrocarbons produced is maximized and the amount of methane and carbon dioxide is minimized.

Fischer-Tropsch catalysts are known in the art, and frequently comprise, as the catalytically active component, a metal from Group VIII of the Periodic Table. (References herein to the Periodic Table relate to the previous IUPAC version of the Periodic Table of Elements such as that described in the 68th Edition of the Handbook of Chemistry and Physics (CPC Press)). Particular catalytically active metals include ruthenium, iron, cobalt and nickel. Cobalt is a preferred catalytically active metal. The catalytically active metal is preferably supported on a porous catalyst support. The porous catalyst support may be selected from any of the suitable refractory metal oxides or silicates or combinations thereof known in the art. Particular examples of preferred porous catalyst supports include silica, alumina, titania, zirconia, ceria, gallia and mixtures thereof, especially silica and titania. A process for the preparation of such catalysts is described in EP 1 042 067.

One way of producing a catalyst precursor, a catalyst, or a catalyst support for a multitubular fixed bed reactor is to feed a paste comprising a support material and optionally a catalytically active component or a precursor thereof from a hopper into an extruder. In case the extrusion is part of a method in which a Fischer Tropsch catalyst is produced, the paste may comprise a catalytically active metal and/or a promoter. A number of dies at the end of the extruder each comprise a plurality of small apertures through which the paste is forced. The resulting extrudate is an elongated catalyst precursor, catalyst, or catalyst support suitable for use in a fixed bed multitubular reactor.

The catalyst used in such a multitubular reactor is limited by mass transfer and so maximizing its external surface area is preferred. Therefore a variety of shapes may be produced by the dies to maximize external surface area and minimize the pressure drop in the reactor. EP 0 510 770 describes the production of a helical trilobed extrudate and an extended trilobe shape is disclosed in WO/03/103833. WO2004/041430 describes particles with an elongated cross section.

Extrusions aimed at forming relatively small and alternative shapes make high demands upon the extrudability of the extrusion mix, which can be optimized by varying the liquid content, and/or application of extrusion aids, for instance methylcellulose.

BRIEF SUMMARY OF THE INVENTION

According to the present invention, there is provided a method of manufacturing a catalyst, a catalyst precursor, or a catalyst support comprising:

(a) mixing a refractory metal oxide or precursor thereof with a liquid and optionally a catalytically active component or a precursor thereof to form a paste;

(b) adding said paste to an extruder, the extruder having a die plate comprising one or more dies, each die having a plurality of apertures, each aperture having an inlet and an outlet, the outlet of each aperture having a cross sectional area of 6 mm² or less, preferably 4 mm² or less, especially 2.2 mm² or less;

(c) extruding the paste through said apertures to form catalyst support extrudates;

wherein the inlet of the apertures has a greater cross sectional area than the outlet of said apertures; and wherein for at least one die the combined cross sectional area of all apertures at the inlet of the apertures relative to the total cross sectional area of the die at the inlet is higher than 50%, preferably more than 70%, especially more than 80%.

DETAILED DESCRIPTION

The die or dies in the die plate used in the method according to the invention has/have a plurality of apertures. The inlet of each aperture has a greater cross sectional area than the outlet of each aperture. When the cross sectional area of each aperture at the inlet is counted up for a die, this combined cross sectional area preferably makes up more than 50%, more preferably more than 70%, most preferably more than 80% of the total cross sectional of that die at the inlet of the die. In the method according to the invention for at least one die the combined cross sectional area of all apertures at the inlet of the apertures relative to the total cross sectional area of the die at the inlet is higher than 50%, preferably more than 70%, especially more than 80%. When the die plate comprises more than one die, at least one die, preferably at least 80% of the dies, more preferably each die in the die plate, has a combined cross sectional area of all apertures at the inlet of the apertures relative to the total cross sectional area of the die at the inlet which is higher than 50%, preferably more than 70%, especially more than 80%.

The method according to the present invention may comprise adding further components, such as additional refractory metal oxides, additives, or one or more promoters to form the paste in step (a). For example, an extrusion aid may be added to form the paste in step (a).

The refractory metal oxide in the resulting extrudate may act as a catalyst support material.

A catalyst or catalyst precursor may be prepared by adding in step (a) a catalytically active component or a precursor thereof to the mixture to form the paste. Additionally or alternatively, a catalytically active component may be added after step (d).

According to a second aspect of the present invention there is provided a die for an extruder comprising a plurality of apertures, each aperture having an inlet and an outlet wherein the inlet of the apertures has a greater cross sectional area than the outlet of said apertures; the outlet of each aperture having a cross sectional area of 6 mm$^2$, preferably 4 mm$^2$ or less especially 2.2 mm$^2$ or less; and wherein the combined cross sectional area of all apertures at the inlet of the apertures relative to the total cross sectional area of the die at the inlet is higher than 50%, preferably more than 70%, especially more than 80%.

According to a third aspect of the present invention there is provided a die plate for an extruder comprising one or more dies, each die having a plurality of apertures, each aperture having an inlet and an outlet, the outlet of each aperture having a cross sectional area of 6 mm$^2$ or less, preferably 4 mm$^2$ or less, especially 2.2 mm$^2$ or less;

wherein the inlet of the apertures has a greater cross sectional area than the outlet of said apertures; and wherein for at least one die the combined cross sectional area of all apertures at the inlet of the apertures relative to the total cross sectional area of the die at the inlet is higher than 50%, preferably more than 70%, especially more than 80%. When the die plate comprises more than one die, at least one die, preferably at least 80% of the dies, more preferably each die in the die plate, has a combined cross sectional area of all apertures at the inlet of the apertures relative to the total cross sectional area of the die at the inlet which is higher than 50%, preferably more than 70%, especially more than 80%.

In one embodiment, a die, or one or more of the dies in a die plate, may have an uneven surface at the inlet of the die. For example, the inlets of some or all of the apertures may be lower than the surface on the edge of the die. In that case the rims between some or all of the apertures at the inlets of the apertures are lower than the surface on the edge of the die. The total cross sectional area at the inlet of the die is defined as the total cross sectional area of the die at the level of the surface at the inlet on the edge of the die.

When the method of the current invention is applied, the extrudability of the extrusion mix is improved as compared to known methods. When the die or the die plate of the current invention is applied in an extrusion process, the extrudability of the extrusion mix has been improved as compared to an extrusion process in which a known die or die plate is used. One advantage of the current invention is that the production rate can be increased, especially by increasing the speed of extrusion. Another advantage is that leakage from the extruder head can be minimized. A further advantage is that the pressure within the extruder can be reduced. Highly advantageous is that the accumulation of static paste between two inlets of the die can be reduced.

An extruder may comprise a die plate with a plurality of dies with the die plate attached to an extrusion head. A die plate according to the invention preferably comprises 1-100 dies, more preferably 1-40, most preferably 20-30 dies. For certain embodiments, twenty four dies may be provided in the extruder.

It has been found that increasing the cross sectional area of the inlet of the apertures relative to the outlet of the apertures reduces the pressure, particularly the pressure immediately upstream of the die. This can increase the rate at which paste may be forced through the apertures in the die and reduce leakage of paste between a die plate and the extrusion head.

It has also been found that by increasing the combined cross sectional area of all apertures at the inlet of the apertures relative to the total cross sectional area of the die at the inlet leads to a lower proportion of the cross sectional area of the rims between the apertures. These rims cause a proportion of the extrusion paste to remain static and may accumulate upstream of the die. In some cases this accumulation results in undesired blockage of the total die. Thus by increasing relative proportion of the combined cross sectional area of all apertures at the inlet of the apertures results in an easier flow of all the extrusion paste with a reduced propensity of blockage by the paste.

In addition it has been found that by increasing the sharpness of the rims between the apertures a cutting action can be generated, which leads to an even better flow of the mix leading to reduced pressure and a lower propensity of blockage.

Figure 1:
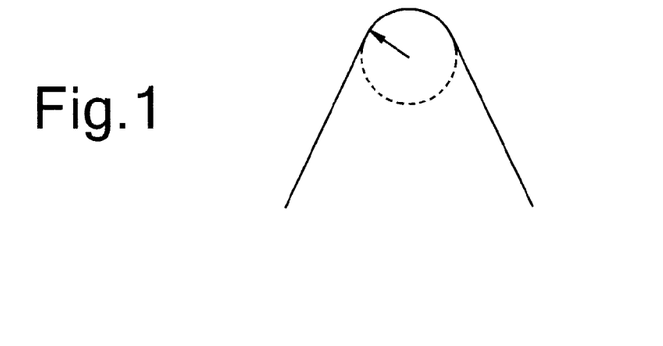
FIG. 1 is a schematic representation of a rim between inlets of apertures in a die plate showing a rounded edge.

In a preferred embodiment, the die, or one or more of the dies in the die plate, comprises rims between the inlet of apertures with a relatively sharp edge pointing in the opposite direction of the extrusion flow. FIG. 1 exemplifies this for one embodiment; the radius of the rounding of the edge of the rim is indicated by the arrow in FIG. 1. The radius of the rounding of the edge of the rim preferably is 0.3 mm or less, more preferably 0.1 mm or less, most preferably 0.05 mm or less. Preferably at least 60%, more preferably at least 75%, most preferably at least 90% of the rims between the inlets of the apertures of a die have an edge with a rounding of 0.3 mm or less, more preferably 0.1 mm or less, most preferably 0.05 mm or less.

The outlet of the apertures in the die, or in one or more of the dies in the die plate, have a cross sectional area of 6 mm$^2$, preferably 4 mm$^2$ or less especially 2.2 mm$^2$ or less. Such small outlets normally cause particular difficulty in extruding paste therethrough. In general the smaller the apertures the more difficult it is to force a paste through. The current invention reduces this problem significantly. Indeed the cross sectional area of the outlets in the present invention may even be 1.9 mm$^2$ or less, preferably less than 1.6 mm$^2$, especially less than 1.4 mm$^2$ or indeed less than 1.25 mm$^2$. Preferably the cross sectional area of the outlets is larger than 0.1 mm$^2$, more preferably larger than 0.2 mm$^2$.

The difficulty of pushing the paste through also depends on the length of the apertures—longer apertures cause the movement of the paste to slow. The length of an aperture is defined as the distance from the inlet of the aperture to the outlet of the aperture.

Typically each aperture has a tapered portion, especially a tapered opening. By introducing a tapered opening this will lead i) to an increase of the cross sectional area of the inlet relative to the outlet, ii) to an increase of the combined cross sectional area of all apertures at the inlet of the apertures relative to the total cross sectional area of the die at the inlet, iii) to an increase of the sharpness of the rims between the apertures.

Preferably in addition to the tapered portion the apertures also comprise a channel with substantially equal inlet dimensions and outlet dimensions. Thus preferably the channel has parallel opposite sides and preferably is not tapered. Such channel will shape the dimensions of the eventual extrudate that is produced by the die.

The walls between these channels should have enough volume to provide enough mechanical support to the die to withstand the high pressures at the inlet of the die.

The channel may be 2-30 mm in length, preferably 5-12 mm in length.

Preferably the length of the channel is 50-80% of the thickness of the die. The thickness of the die is defined as the distance between the inlet of the die to the outlet of the die. In case of an uneven surface at the inlet, the thickness of the die is calculated using the level of the surface at the inlet on the edge of the die.

To leave enough wall volume between the channels, preferably the combined cross sectional area of all channel apertures relative to the total cross sectional area of the die at that position in the die is lower than 50%, preferably lower than 40%, especially lower than 30%.

The combined cross sectional area of all apertures at the outlet of the apertures relative to the total cross sectional area of the die at the outlet is lower than 50%, preferably lower than 40%, especially lower than 30%.

The angle of the taper, that is the angle between the tapered portion and the general direction of movement of the extrudate may be 10-45, preferably 20-40° more preferably around 30°.

Preferably the tapered portion is a cone-shaped portion, although it may be a concave-shaped portion.

For certain embodiments, a longitudinal path defined between an inlet to an outlet of each of the plurality of the apertures is parallel to the direction of movement of the extrudate. More preferably the whole cross sectional area defined by the outlet of each of a plurality of apertures is longitudinally aligned with a portion of the inlet, the longitudinal alignment being parallel with the direction of movement of the extrudate. Therefore dies which, for example, produce helical shaped extrudates are excluded from such embodiments.

Preferably the ratio between the length of the apertures and the perimeter of the apertures is in the range of 0.2-10, more preferably 0.5-5, most preferably 1-4.

Typically the extrudates are elongate shaped.

Preferably the apertures according to the present invention have an asymmetrical cross section. Nevertheless, the apertures in the die may be of any cross sectional shape, such as cylindrical, hollow-cylindrical, hexagonal, trilobed, elongated etcetera. The disclosures of EP 0 510 770, WO/03/103833, and WO2004/041430 which describe various extrudate shapes are incorporated herein by reference in their entirety. A preferred shape has an elongated cross section such as a C-shaped cross section.

An especially preferred shape is the so-called CA shape—an asymmetric cross sectional C-shape. This is defined by four circles each arranged to be at a tangent to an inner unoccupied circle. That is, an arc of a circle (the unoccupied circle) is defined by the C-shape arrangement of the four circles and their respective tangential points which define a circle.

Alternatively the shape may also be a V shape, that is three circles may be arranged in a V shape, defining an unoccupied central circle or arc by their respective tangential points. Preferably each circle contacts the other circles tangentially.

In said CA arrangement, the top and bottom circles contact one other circle and each central circle contacts two neighbouring circles; all in addition to the tangential arrangement around the unoccupied central circle/arc. In the CA shape and V shape, all contacts between the circles are preferably tangential although the interstitial areas immediately adjacent the tangent points are also occupied by the particles.

In said CA arrangement, preferably therefore the cross sectional area is built up from four circles, in which the angle between the two lines connecting the centres of three adjacent circles is between 110° and 150° or between 210° and 250°, more preferably 120° or 240°. An asymmetrical C-shape results.

Although the circles describe tangential points, certain deviations from exact tangential points may occur. If the deviations are +/−0.1 mm from exact tangential points, then they are still considered tangential as described herein.

Optionally each circle has the same radius.

Preferably the (unoccupied) circle/arc defined, has the same radius as the three or four circles.

For use in diffusion limited reactions, the outer circles of certain embodiments may have a larger radius than the inner circles.

Occasionally, where strength is important compared to diffusion limitations, the internal circles may be larger than the external circles.

Preferably the circles are as described in WO2004/041430 the disclosure of which is incorporated herein in its entirety by reference.

Preferably there are 2-100, more preferably 10-80, even more preferably 32-42 apertures in each die, especially around 37.

The die may be 1-20 cm in diameter, preferably 2-10 cm, especially around 2.5 cm.

There may be around 5-25 apertures $cm^{-2}$ in each die, preferably 10-15, especially around 12.

The apertures in the dies may be spaced apart in a variety of formations such as square or triangular.

The dies may be made from metal such as stainless steel or from polymers. Polymeric dies are preferred as they are easier to manufacture and more durable. The dies may be made by constructing an appropriately shaped mould and adding, in liquid form, suitable mouldable material into the mould and allowing it to set.

Preferably therefore the dies are made substantially from polymers, which in this case means at least 95% from polymers preferably more.

Alternatively the mould may be simplified to provide a more basic shape in a moulding operation, the moulding operation being as described above. Further apertures may be added to the moulded shape after moulding.

A catalyst precursor, a catalyst, or a catalyst support may be prepared using the method, die, and/or die plate according to the present invention. A paste comprising a support material and optionally a catalytically active component or a precursor thereof can be fed into an extruder. The paste may be forced through a plurality of apertures in one or more dies at the end of the extruder.

The catalytically active component may be impregnated after extrusion or may be added with the paste before extrusion.

In case the extrusion is part of a method in which a Fischer Tropsch catalyst is prepared, the catalytically active component preferably is a metal from Group VIII of the Periodic Table. (References herein to the Periodic Table relate to the previous IUPAC version of the Periodic Table of Elements such as that described in the 68th Edition of the Handbook of Chemistry and Physics (CPC Press)). Particular catalytically active metals include ruthenium, iron, cobalt and nickel. Cobalt is a preferred catalytically active metal.

When the metal is added before extrusion, the following steps may take place to form the paste: mixing (i) porous refractory oxide, (ii) a liquid, and (iii) a metal compound, which is at least partially insoluble in the amount of liquid used, to form a mixture.

Any metal compound which is at least 50% by weight is insoluble in the amount of liquid used, can be suitably used in the process of the invention.

Preferably, at least 70% by weight of the metal compound is insoluble in the amount of liquid used, more preferably at least 80% by weight, still more preferably at least 90% by weight. Examples of suitable metal compounds are metallic powder, metal hydroxide, metal oxides or mixtures thereof, for example $Co(OH)_2$ or $Co_3O_4$.

The amount of metal compound present in the mixture may vary widely. Typically, the mixture comprises up to 60 parts by weight of metal per 100 parts by weight of refractory oxide, preferably 10-40 parts by weight. The above amounts of metal refer to the total amount of metal rather than metal compounds and can be determined by known elemental analysis techniques.

The optimum amount of catalytically active metal present on the support depends inter alia on the specific catalytically active metal. Typically, the amount of cobalt present in the catalyst may range from 1 to 100 parts by weight per 100 parts by weight of support material, preferably from 3 to 50 parts by weight per 100 parts by weight of support material.

The catalytically active metal may be present in the paste together with one or more metal promoters or co-catalysts. Alternatively the promoter may be added after extrusion.

The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB, VIIB and/or VIII of the Periodic Table, in particular titanium, zirconium, manganese and/or vanadium, especially manganese or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

The promoter, if present in the catalyst, is typically present in an amount of from 0.001 to 100 parts by weight per 100 parts by weight of support material, preferably 0.05 to 20, more preferably 0.1 to 15. It will however be appreciated that the optimum amount of promoter may vary for the respective elements which act as promoter.

The refractory metal oxide may be a porous support material such as silica, alumina, titania, zirconia, ceria, gallia and mixtures or precursors thereof, especially silica or titania. For one embodiment a silica precursor tetraethyl orthosilicate (TEOS, $Si(OCH_2CH_3)_4$) is utilized.

To improve the flow properties of the mixture, it is preferred to include one or more flow improving agents and/or extrusion aids in the mixture prior to extrusion. Suitable additives for inclusion in the mixture include fatty amines, quaternary ammonium compounds, polyvinyl pyridine, polyvinyl alcohol, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc. Another suitable extrusion aid is methylcellulose.

To obtain strong extrudates, it is preferred to include in the mixture, prior to extrusion, at least one compound which acts as a peptising agent for the refractory metal oxide. Suitable peptising agents for inclusion in the extrudable mixture are well known in the art and include basic and acidic compounds. Examples of basic compounds are ammonia, ammonia-releasing compounds, ammonium compounds or organic amines. Such basic compounds are removed upon calcination and are not retained in the extrudates to impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included in the mixture, prior to extrusion, in order to create macropores in the resulting extrudates. Suitable burnout materials are commonly known in the art.

The total amount of flow-improving agents/extrusion aids, peptising agents, and burn-out materials in the mixture preferably is in the range of from 0.1 to 20% by weight, more preferably from 0.5 to 10% by weight, on the basis of the total weight of the mixture.

The paste may include other additives such as a binder, for example Tyzor™.

The mixing in step (a) may be performed by kneading or mulling. The mixture obtained may have a solids content in the range of from 30 to 90% by weight, preferably from 50 to 80% by weight.

Before extrusion, the mixture may be mixed for 1 m-4 h, preferably 5 m-2 h, more preferably 10 m-1 h, especially around 15 m.

The mixing may be done at a temperature in the range of 15-60° C., preferably 20-45° C.

The liquid is preferably water although $C_1$-$C_4$ alcohols may be used, especially methanol, ethanol or propanol. Also ammonia, ethers, e.g. MTBE, and ketones, e.g. acetone or MEK; aldehydes such as propanal; and aromatic solvents such as toluene may be used. Mixtures are also possible.

Following extrusion through the apertures, the friction typically increases the temperature of the paste to around 40-70° C. especially 50-60° C. and some of the liquid is evaporated.

The resulting extrudate is typically strong and flexible.

The extruder may be any type of extruder such as a plunger-type extruder, a single screw extruder, a double screw extruder etc such as those shown and described in Perry's Chemical Engineers Handbook 7th Edition 18-29 to 18-31.

After extrusion the extrudate is typically subjected to drying and/or to calcination at a temperature of generally from 350 to 750° C., preferably a temperature in the range of from 450 to 550° C. The effect of the calcination treatment is to remove crystal water, to decompose volatile decomposition products and to convert any organic and inorganic compounds to their respective oxides.

If appropriate, the catalytic metal and/or the promoter are impregnated onto the dried and/or calcined extrudate, optionally followed by drying and/or calcination. The drying temperature is normally between ambient temperature to 150° C.

The resulting catalyst or catalyst precursor is usually activated by contacting the catalyst with hydrogen or a hydrogen-containing gas, typically at temperatures of about 200 to 450° C.

A particularly preferred catalyst comprises a titania support with a cobalt active metal and a manganese promoter. One suitable support material is P25 Degussa™. A process for the preparation of such catalysts is described in EP 1 042 067, the disclosure of which is incorporated herein in its entirety by reference.

Preferably the BET surface area for the catalyst support following calcination at 550° C. for 2 hours is 5-1000 $m^2/g$, preferably 10-450 $m^2/g$, most preferably 30-100 $m^2/g$.

The resulting catalyst is preferably used in a Fischer-Tropsch process.

The Fischer-Tropsch process is well known to those skilled in the art and involves synthesis of hydrocarbons from syngas, by contacting the syngas at reaction conditions with a Fischer-Tropsch catalyst.

The synthesis gas can be provided by any suitable means, process or arrangement. This includes partial oxidation and/or reforming of a hydrocarbonaceous feedstock as is known in the art.

Typically the synthesis gas is produced by partial oxidation of a hydrocarbonaceous feed. The partial oxidation of gaseous feedstocks, producing mixtures of especially carbon monoxide and hydrogen, can take place according to various established processes. These processes include the Shell Gasification Process. A comprehensive survey of this process can be found in the Oil and Gas Journal, Sep. 6, 1971, pp 86-90.

To adjust the $H_2$/CO ratio in the syngas, carbon dioxide and/or steam may be introduced into the partial oxidation process. Preferably up to 15% volume based on the amount of syngas, preferably up to 8% volume, more preferable up to 4% volume, of either carbon dioxide or steam is added to the feed. Water produced in the hydrocarbon synthesis may be used to generate the steam. As a suitable carbon dioxide source, carbon dioxide from the effluent gasses of the expanding/combustion step may be used. The $H_2$/CO ratio of the syngas is suitably between 1.5 and 2.3, preferably between 1.6 and 2.0. If desired, (small) additional amounts of hydrogen may be made by steam methane reforming, preferably in combination with the water gas shift reaction. Any carbon monoxide and carbon dioxide produced together with the hydrogen may be used in the gasification and/or hydrocarbon synthesis reaction or recycled to increase the carbon efficiency. Hydrogen from other sources, for example hydrogen itself, may be an option.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

The Fischer-Tropsch tail gas may be added to the partial oxidation process.

The Fischer-Tropsch process according to the present invention can be carried out in a fixed bed regime, especially a trickle flow regime. A very suitable reactor is a multitubular fixed bed reactor.

The Fischer-Tropsch process is catalysed by a catalyst produced by a process and a die as described herein.

The catalyst formed in accordance with the present invention increases performance of the extrusion process and is particularly attractive when thin asymmetric extrudates are required—for example in mass transfer limited reactions. Thus embodiments of the invention may be used for reactions other than Fischer-Tropsch, for example the catalyst produced may be used as a hydrocracking catalyst or a hydroprocessing catalyst.

In addition to the carriers/supports detailed above, hydrocracking and hydroprocessing catalysts may have supports made from zeolites and/or up to 85% amorphous silica aluminas (ASAs) with, for example, alumina binder.

Products of the Fischer-Tropsch synthesis may range from methane to heavy paraffin waxes. Preferably, the amount of $C_{5+}$ hydrocarbons is at least 60% by weight of the total product, more preferably, at least 70% by weight, even more preferably, at least 80% by weight, most preferably at least 85% by weight.

The hydrocarbons produced in the process are suitably C3-200 hydrocarbons, more suitably C4-150 hydrocarbons, especially C5-100 hydrocarbons, or mixtures thereof. These hydrocarbons or mixtures thereof are liquid or solid at temperatures between 5 and 30° C. (1 bar), especially at about 20° C. (1 bar), and usually are paraffinic of nature, while up to 30 wt %, preferably up to 15 wt %, of either olefins or oxygenated compounds may be present.

Depending on the catalyst and the process conditions used in a Fischer-Tropsch reaction, various proportions of normally gaseous hydrocarbons, normally liquid hydrocarbons and optionally normally solid hydrocarbons are obtained. It is often preferred to obtain a large fraction of normally solid hydrocarbons. These solid hydrocarbons may be obtained up to 90 wt % based on total hydrocarbons, usually between 50 and 80 wt %.

Preferably the Fischer-Tropsch catalyst used yields substantial quantities of paraffins, more preferably substantially unbranched paraffins. A part may boil above the boiling point range of the so-called middle distillates. The term "middle distillates", as used herein, is a reference to hydrocarbon mixtures of which the boiling point range corresponds substantially to that of kerosene and gasoil fractions obtained in a conventional atmospheric distillation of crude mineral oil. The boiling point range of middle distillates generally lies within the range of about 150 to about 360° C.

The higher boiling range paraffinic hydrocarbons, if present, may be isolated and subjected to a catalytic hydrocracking step, which is known per se in the art, to yield the desired middle distillates. The catalytic hydro-cracking is carried out by contacting the paraffinic hydrocarbons at elevated temperature and pressure and in the presence of hydrogen with a catalyst containing one or more metals having hydrogenation activity, and supported on a carrier comprising an acidic function. Suitable hydrocracking catalysts include catalysts comprising metals selected from Groups VIB and VIII of the (same) Periodic Table of Elements. Preferably, the hydrocracking catalysts contain one or more noble metals from Group VIII. Preferred noble metals are platinum, palladium, rhodium, ruthenium, iridium and osmium. Most preferred catalysts for use in the hydro-cracking stage are those comprising platinum.

The amount of catalytically active noble metal present in the hydrocracking catalyst may vary within wide limits and is typically in the range of from about 0.05 to about 5 parts by weight per 100 parts by weight of the carrier material. The amount of non-noble metal present is preferably 5-60%, preferably 10-50%.

Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may be transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

Thus the invention also provides hydrocarbon products synthesised by a catalyst made by a process or die as described herein.

The hydrocarbon products may have undergone the steps of hydroprocessing, preferably hydrogenation, hydroisomerization and/or hydrocracking.

The hydrocarbon may be a fuel, preferably napta, kerosene or gasoil, a waxy raffinate or a base oil.

Any percentage mentioned in this description is calculated on total weight or volume of the composition, unless indicated differently. When not mentioned, percentages are considered to be weight percentages. Pressures are indicated in bar absolute, unless indicated differently.

EXAMPLES

Example 1

Embodiments of the present invention will now be described, by way of example only, with reference to the accompanying figures.

Figure 2:
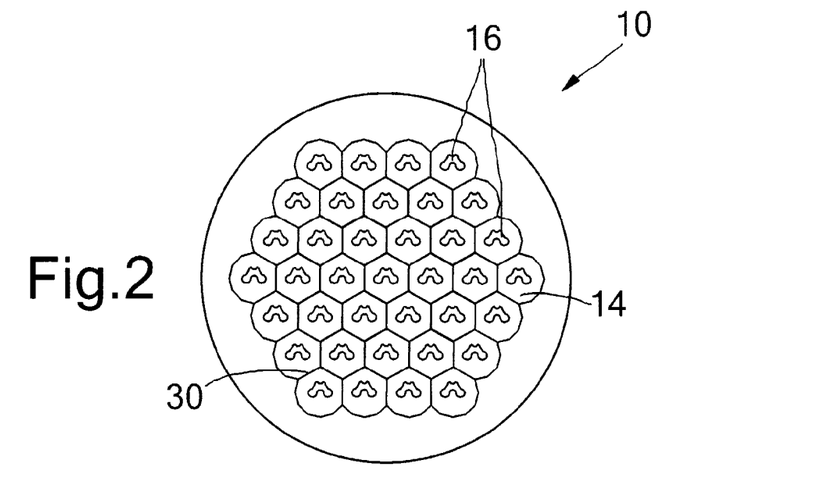
FIG. 2 is a plan view of a die for an extruder in accordance with one aspect of the present invention.
Figure 3:
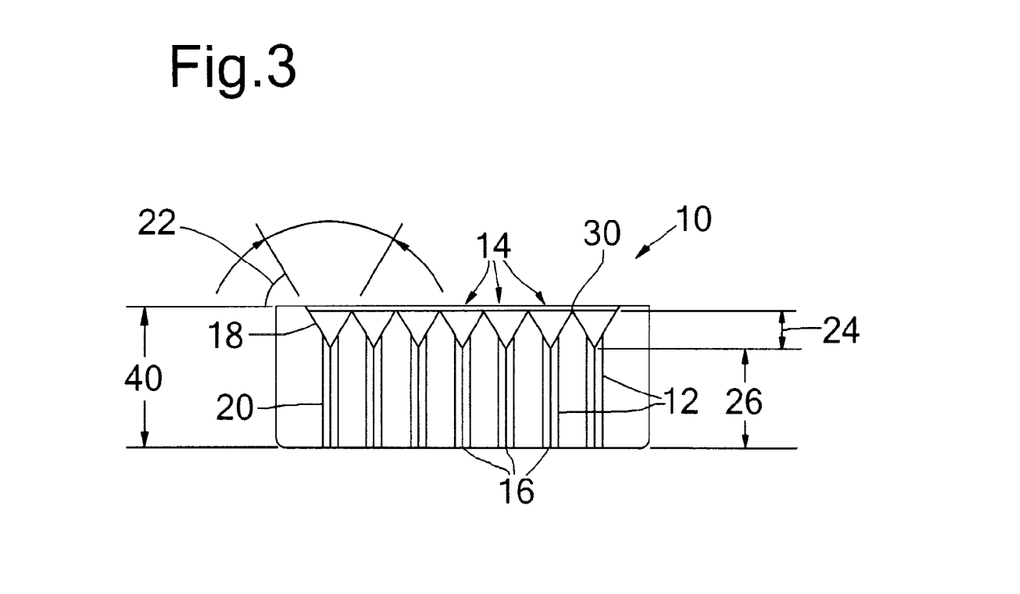
FIG. 3 is a side-sectional view of the die of FIG. 1.

A die 10 is shown in FIGS. 2 & 3 and comprises a series of apertures 12 extending though the die from a first side to a second, opposite side. The die 10 may be provided in an outlet end of an extruder (not shown). Many such dies may be provided in a die plate connected to an extruder head of the extruder. In one embodiment there are twenty four such dies.

In accordance with the present invention, the apertures have an inlet 14 of a greater cross-sectional area than the outlet 16, as shown in FIGS. 2 and 3. Between the apertures at the inlet are rims 30. Each aperture comprises a cone-shaped portion 18 and a channel portion 20. The cone-shaped portions 18 increase the diameter of the inlets 14 of the apertures such that they are larger than the outlets 16. The length 24 of the cone-shaped portion may be around 3 mm and the length 26 of the channel portion 20 may be around 6.5 mm. The die has thickness 40. In this embodiment, the angle 22 of the taper is around 60° and the cross sectional area of the outlets 16 is 0.9 mm$^2$. Also in this embodiment, the cross-sectional shape at the outlet of the apertures 12 is C-shaped, although other cross-sectional shapes may be used.

As is conventional, a paste is added to the extruder, and the paste forced through apertures in the dies by a screw or plunger in order to form elongated extrudates.

In use the dies 10 are provided at the end of the extruder.

Figure 4:
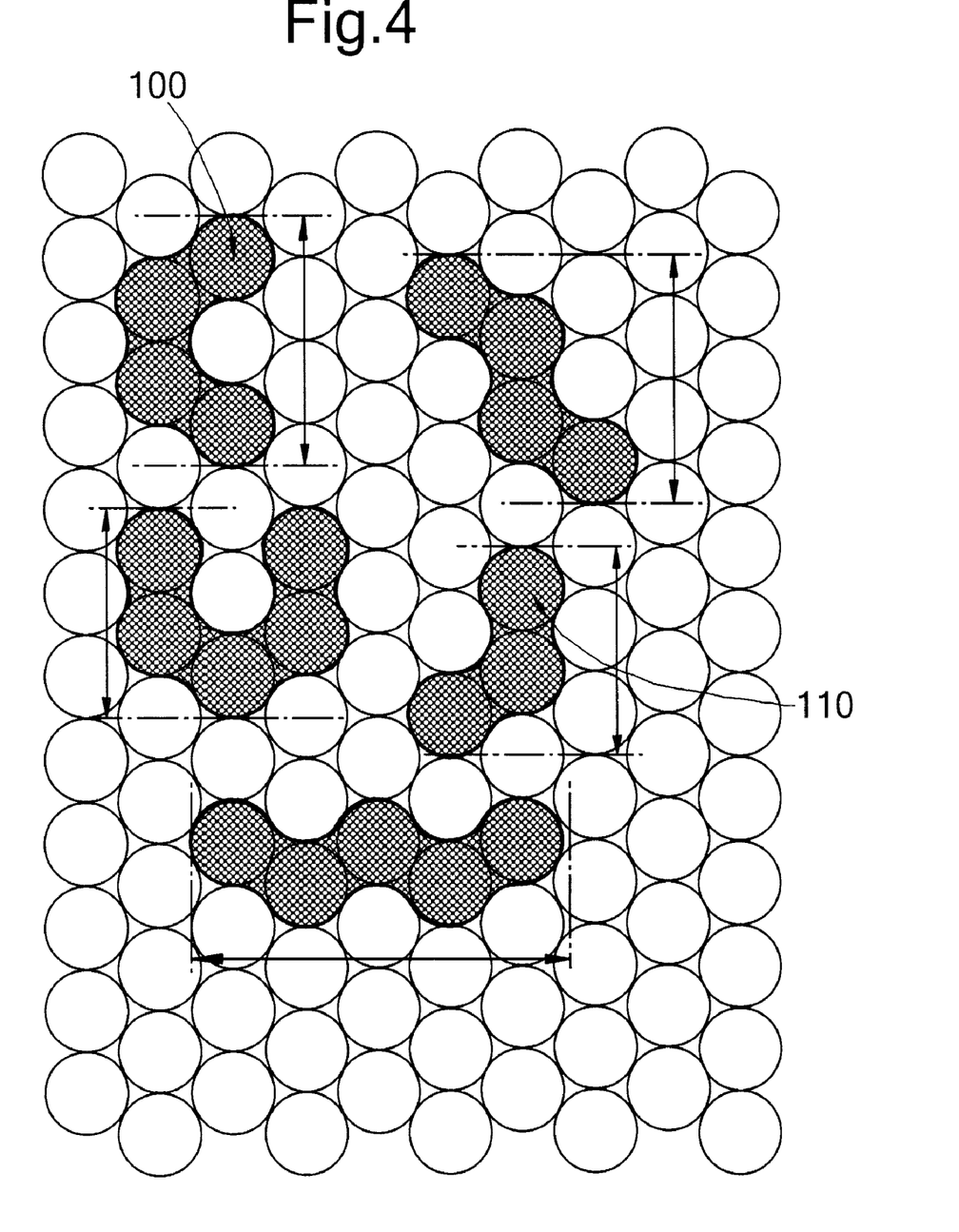
FIG. 4 is a diagram showing the cross-sectional shapes of certain extrudates in accordance with the present invention.

FIG. 4 shows examples of different cross sections of different extrudates that can be formed in accordance with the present invention.

A variety of different cross sectional shapes can be produced by the occupation of a variety of different combinations of said circles—as shown in FIG. 4. The preferred shape 100 is a so-called CA-shape elongated particle. An alternative cross-sectional V-shape 110 may also be used as can the other shapes shown in FIG. 4.

Example 2

A clay-like paste was prepared containing titania, a cobalt and manganese source (cobalt/manganese co precipitated hydroxide) poly vinyl alcohol, citric acid and water.

In a first experiment, a portion of this paste was added to an extruder comprising, at the end thereof, four known dies with non-tapered apertures. The outlet of the apertures in the dies were of the CA-shape.

In a second experiment, another portion of the paste was added to an extruder comprising, at the end thereof, four dies in accordance with the present invention. The apertures had an inwardly tapered opening and a channel, the channel inlet and outlet having a substantially equal cross sectional area. The outlet of the apertures in the dies were of the CA-shape.

The extrudate production rate for the first portion of paste was found to be 10.8 kg/h. The extrudate production rate for the second portion of paste was found to be 18.3 kg/h. Thus a significant increase in production rate was found for dies in accordance with the present invention compared to known dies. Moreover no leakage was observed from the extruder head whereas for extruder heads with known apertures, leakage of 1-2% of the paste is normal.

Embodiments of the present invention benefit in that an increased yield of extrudates during manufacturing results compared to known dies.

Embodiments of the present invention benefit in that the pressure within the extruder is less compared to known dies.

Embodiments of the present invention benefit in that accumulation of static paste between two inlets of the die does not occur to such a great extent because these are now relatively larger.

Improvements and modifications may be made without departing from the scope of the invention.

What is claimed is:

1. A method of manufacturing a catalyst, a catalyst precursor, or a catalyst support comprising:
    (a) mixing a refractory metal oxide or precursor thereof with a liquid and optionally a catalytically active component or a precursor thereof to form a paste;
    (b) adding said paste to an extruder, the extruder having a die plate comprising one or more dies, each die having a plurality of apertures, each aperture having an inlet and an outlet, the outlet of each aperture having a cross sectional area of 6 mm$^2$ or less; and
    (c) extruding the paste through said apertures to form catalyst support extrudates;
    wherein the inlet of the apertures has a greater cross sectional area than the outlet of said apertures; and
    wherein for at least one die the combined cross sectional area of all apertures at the inlet of the apertures relative to the total cross sectional area of the die at the inlet is higher than 50%.

2. A method as claimed in claim 1, wherein one or more of the dies comprise rims between the inlet of apertures with an edge pointing in the opposite direction of the extrusion flow, said rim edge having a rounding with a radius of 0.3 mm or less.

3. A method as claimed in claim 2, wherein said rim edge has a rounding with a radius of 0.1 mm or less.

4. A method as claimed in claim 1, wherein each aperture has an inwardly tapered opening.

5. A method as claimed in claim 1, wherein the apertures further comprise a channel having a channel inlet and a channel outlet, the channel inlet and outlet having a substantially equal cross sectional area.

6. A method as claimed in claim 1, wherein the outlet of each aperture has a cross sectional area of 2.2 mm$^2$ or less.

7. A method as claimed in claim 1, wherein for at least one die the combined cross sectional area of all apertures at the inlet of the apertures relative to the total cross sectional area of the die at the inlet is higher than 80%.

8. A die for an extruder comprising a plurality of apertures, each aperture having an inlet and an outlet wherein the inlet of the apertures has a greater cross sectional area than the outlet of said apertures; the outlet of each aperture having a cross sectional area of 6 mm$^2$ or less; and wherein the combined cross sectional area of all apertures at the inlet of the apertures relative to the total cross sectional area of the die at the inlet is higher than 50%.

9. A die as claimed in claim 8, wherein the die comprises rims between the inlet of apertures with an edge pointing in the opposite direction of the extrusion flow, said rim edge having a rounding with a radius of 0.3 mm or less.

10. A die as claimed in claim 8, wherein each aperture has an inwardly tapered opening.

11. A die as claimed in claim 8, wherein the apertures also comprise a channel having a channel inlet and a channel outlet, the channel inlet and outlet having a substantially equal cross sectional area.

12. A die as claimed in claim 8, wherein the ratio between the length of the apertures and the perimeter of the apertures is in the range of 0.2-10.

13. A die as claimed in claim 8, wherein the outlet of each aperture has a cross sectional area of 2.2 mm$^2$ or less.

14. A die as claimed in claim 8, wherein for at least one die the combined cross sectional area of all apertures at the inlet of the apertures relative to the total cross sectional area of the die at the inlet is higher than 80%.

15. A die as claimed in claim 8, wherein said rim edge has a rounding with a radius of 0.1 mm or less.

16. A die plate comprising one or more dies as claimed in claim 8.

* * * * *